(12) United States Patent
Terribilini et al.

(10) Patent No.: US 9,996,691 B1
(45) Date of Patent: Jun. 12, 2018

(54) USING SIGNALS FROM DEVELOPER CLUSTERS

(71) Applicant: Google Inc., Mountain View, CA (US)

(72) Inventors: Ryan James Terribilini, San Francisco, CA (US); Alec Go, Mountain View, CA (US)

(73) Assignee: Google LLC, Mountain View, CA (US)

( * ) Notice: Subject to any disclaimer, the term of this patent is extended or adjusted under 35 U.S.C. 154(b) by 56 days.

(21) Appl. No.: 14/801,526

(22) Filed: Jul. 16, 2015

Related U.S. Application Data

(62) Division of application No. 14/158,860, filed on Jan. 19, 2014, now Pat. No. 9,111,093.

(51) Int. Cl.
| | | |
|---|---|---|
| *G06F 11/00* | (2006.01) | |
| *G06F 21/55* | (2013.01) | |
| *G06F 21/57* | (2013.01) | |

(52) U.S. Cl.
CPC ............ *G06F 21/554* (2013.01); *G06F 21/57* (2013.01); *G06F 2221/033* (2013.01)

(58) Field of Classification Search
CPC ................................ G06F 21/57; H04L 63/20
USPC .......................................................... 726/22
See application file for complete search history.

(56) References Cited

U.S. PATENT DOCUMENTS

| | | | |
|---|---|---|---|
| 7,326,056 B1 | 2/2008 | Foster et al. | |
| 7,725,544 B2 | 5/2010 | Alspector et al. | |
| 8,566,115 B2 | 10/2013 | Moore et al. | |
| 8,984,151 B1* | 3/2015 | Hsieh | H04L 63/10 709/203 |
| 8,984,581 B2 | 3/2015 | Luna et al. | |
| 2004/0215977 A1 | 10/2004 | Goodman et al. | |
| 2007/0071238 A1* | 3/2007 | Adams | H04L 9/3247 380/46 |
| 2007/0074033 A1* | 3/2007 | Adams | G06F 21/629 713/176 |
| 2009/0254572 A1 | 10/2009 | Redlich et al. | |
| 2010/0250497 A1 | 9/2010 | Redlich et al. | |
| 2011/0098108 A1* | 4/2011 | Kuper | A63F 13/60 463/29 |
| 2011/0154441 A1* | 6/2011 | Oh | G06F 8/20 726/3 |
| 2012/0016814 A1 | 1/2012 | Evans et al. | |
| 2012/0030354 A1* | 2/2012 | Razzaq | G06F 21/335 709/225 |

(Continued)

OTHER PUBLICATIONS

Notice of Allowance from U.S. Appl. No. 14/158,860, dated Apr. 14, 2015, 12 pp.

*Primary Examiner* — Haresh N Patel
(74) *Attorney, Agent, or Firm* — Shumaker & Sieffert, P.A.

(57) ABSTRACT

Systems and techniques are provided for the mining signals from developer clusters in an application ecosystem and the creation of rules to proactively ban applications when they are submitted to the application ecosystem. Applications may be received. Each application may be associated with a developer account that submitted the application to an application ecosystem. Signals may be extracted for one of the applications from one of the applications and the developer accounts. A banned prevalence percentage may be determined for the signal. A signal rule may be generated from the signal based on the banned prevalence percentage for the signal. The signal rule may be stored.

26 Claims, 4 Drawing Sheets

(56) References Cited

U.S. PATENT DOCUMENTS

| | | | |
|---|---|---|---|
| 2012/0072968 A1* | 3/2012 | Wysopal | G06F 11/3612 726/1 |
| 2012/0096516 A1 | 4/2012 | Sobel et al. | |
| 2012/0210422 A1 | 4/2012 | Friedrichs et al. | |
| 2012/0222111 A1 | 4/2012 | Oliver et al. | |
| 2012/0185700 A1* | 7/2012 | Vidrine | G06F 21/57 713/189 |
| 2012/0240236 A1* | 9/2012 | Wyatt | G06F 21/564 726/25 |
| 2012/0259845 A1* | 10/2012 | Matejka | G06F 17/30528 707/723 |
| 2012/0296902 A1* | 11/2012 | Deolalikar | G06F 17/30716 707/737 |
| 2013/0054711 A1 | 2/2013 | Kessner et al. | |
| 2013/0191918 A1 | 7/2013 | Nachenberg | |
| 2013/0198802 A1 | 8/2013 | Ricci et al. | |
| 2013/0226580 A1 | 8/2013 | Witt-Ehsani et al. | |
| 2013/0282438 A1* | 10/2013 | Hunter | G01S 1/02 705/7.32 |
| 2013/0318568 A1 | 11/2013 | Mahaffey et al. | |
| 2013/0326625 A1 | 12/2013 | Anderson et al. | |
| 2014/0047413 A1 | 2/2014 | Sheive et al. | |
| 2014/0113593 A1 | 4/2014 | Zhou et al. | |
| 2014/0129483 A1* | 5/2014 | Isaev | G06Q 30/04 705/400 |
| 2014/0207601 A1* | 7/2014 | Soorianarayanan | G06F 21/6218 705/26.1 |
| 2014/0208266 A1* | 7/2014 | Desai | G06F 3/0482 715/810 |
| 2014/0310075 A1 | 10/2014 | Ricci et al. | |
| 2015/0067831 A1* | 3/2015 | Wawda | G06F 21/57 726/22 |
| 2015/0172057 A1* | 6/2015 | Mahaffey | G06F 8/70 713/176 |
| 2015/0172412 A1* | 6/2015 | Escriva | G06F 17/30091 709/202 |
| 2015/0186974 A1* | 7/2015 | Abbas | G06Q 30/0631 705/26.61 |

\* cited by examiner

USING SIGNALS FROM DEVELOPER CLUSTERS

RELATED APPLICATIONS

The subject application is a divisional of U.S. patent application Ser. No. 14/158,860, filed on Jan. 19, 2014, the entire content of which is herein incorporated by reference.

BACKGROUND

An application ecosystem may be open, allowing any party to develop and submit applications to the application ecosystem for distribution. Applications developers may have their developer accounts banned from submitting applications to the application ecosystem for a variety of reasons, such as the submission of applications containing viruses or malware, or applications that violate data gathering, advertising, hardware usage, or other policies of the application ecosystem. Because the application ecosystem is open, a developer who had their developer account banned from submitting applications may create a new developer account from which to submit applications.

Preventing developers whose developer accounts were banned from submitting applications using new developer accounts may be difficult. When the developer opens a new developer account, it may be unclear that the developer who opened the developer account is in fact the developer who had their previous developer account banned. Signals in the developer's applications and developer account information may be examined to determine whether the developer or the developer's application should be banned from the application ecosystem. This may take time, due to, for example, a manual review process, allowing the developer to distribute and monetize applications in the application ecosystem during the time it takes to determine that the developer or application should be banned. Developers who are able to monetize their applications before having their developer accounts or applications banned may have an incentive to attempt to open new developer accounts from which to submit applications to the application ecosystem, resulting in more untrustworthy applications being submitted to the application ecosystem.

BRIEF SUMMARY

According to an embodiment of the disclosed subject matter, applications may be received, where each application may be associated with a developer account that submitted the application to an application ecosystem. A signal may be extracted for an application from the application or the developer account. A banned prevalence percentage may be determined for the signal. A signal rule may be generated from the signal based on the banned prevalence percentage for the signal. The signal rule may be stored.

An application may be received that was submitted to the application ecosystem from a developer account that is not banned. A signal may be extracted for the submitted application from the submitted application or the developer account. The signal rule may be applied to the signal from the submitted application. The disposition of the submitted application may be determined based on the application of the signal rule to the signal from the submitted application.

That the banned prevalence percentage exceeds at least one threshold may be determined. The quantity of occurrences of the signal in the applications may be determined to exceed a sample size threshold. The signal rules may include a signal, a characteristic of the signal, and an action for an application that includes a signal that triggers the signal rule. The action for the application may be flagging the submitted application for review or banning the submitted application from the application ecosystem. The action may be based on the banned prevalence percentage for the signal. The developer accounts associated with the received applications may be in a developer cluster within the application ecosystem.

The signal includes one item selected from the group of: an account signal, an application signal, or a financial signal, and where an account signal includes one item selected from the group of: a spam signal, an Internet Protocol address signal, and an umbrella account conversion time signal, an application signal includes one item selected from the group of: an application flagging signal, an advertising identification signal, a certificate signal, an asset signal, and a combination application signal, and a financial signal includes a buyer signal.

The spam signal for one of the applications may include a score based on a quantity of umbrella accounts and developer accounts associated with a user of the developer account that submitted the application. The Internet Protocol address signal for one of the applications may be based on an Internet Protocol address associated with the developer account that submitted the application. The umbrella account conversion time signal for one of the applications may be based on the amount of elapsed time between the creation of an umbrella account and a conversion of the umbrella account into the developer account that submitted the application. The application flagging signal for one of the applications may be based on a flag set for an application submitted from the developer account to the application ecosystem, wherein the flag indicates a security risk or policy violation in the application. The advertising identification signal for one of the applications may be based on advertising identifications used by the at least one application. The asset signal for one of the applications may be based on assets used to build the application. The buyer signal for one of the applications may be based on at least one data item for a user associated with the developer account that submitted the application. The combination application for one of the applications signal may be based on the advertising identification signals, the certificate signal, and the asset signal for the application.

The data item may include one of a contact name, a company name, a phone number, a physical address, an email address domain, an email address, a payment instrument, an Internet Protocol address, and a unique identifier for a computing device. The banned prevalence percentage for the signal may be based on the number of banned applications in the received applications including a signal with a characteristic matching a characteristic of the signal and the total number of applications in the received applications including a signal with a characteristic matching the characteristic of the signal. The characteristic of the signal may be one item selected from the group of: an advertising identification for an application, a certificate used to sign the application, an asset used to build the application, an Internet Protocol address used to access the developer account that submitted the application, and a data item for a developer account that submitted the application.

The disposition of the submitted application may include one of the group of: allowing the submitted application into the application ecosystem, flagging the submitted application for review, banning the submitted application from the application ecosystem, and banning the submitted application and the developer account that submitted the application from the application ecosystem. Applying the signal rule to the signal from the submitted application may further include determining if the signal rule is triggered by the signal from the submitted application.

According to an embodiment of the disclosed subject matter, a means for receiving applications, where each application may be associated with a developer account that submitted the application to an application ecosystem, a means for extracting a signal for an application from one of: the applications and the developer accounts, a means for determining a banned prevalence percentage for the signal, a means for generating a signal rule from the signal based on the banned prevalence percentage for the signal, a means for storing the at least one signal rule, a means for receiving an application submitted to the application ecosystem from a developer account that is not banned, a means for extracting a signal for the submitted application from one of: the submitted application and the developer account, a means for applying the signal rule to the at least one signal from the submitted application; and a means for determining the disposition of the submitted application based on the application of the signal rule to the signal from the submitted application are included.

Systems and techniques disclosed herein may allow the mining of signals from developer clusters in an application ecosystem and the creation of rules to proactively ban applications when they are submitted to the application ecosystem. Additional features, advantages, and embodiments of the disclosed subject matter may be set forth or apparent from consideration of the following detailed description, drawings, and claims. Moreover, it is to be understood that both the foregoing summary and the following detailed description are illustrative and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

DETAILED DESCRIPTION

Figure 1:
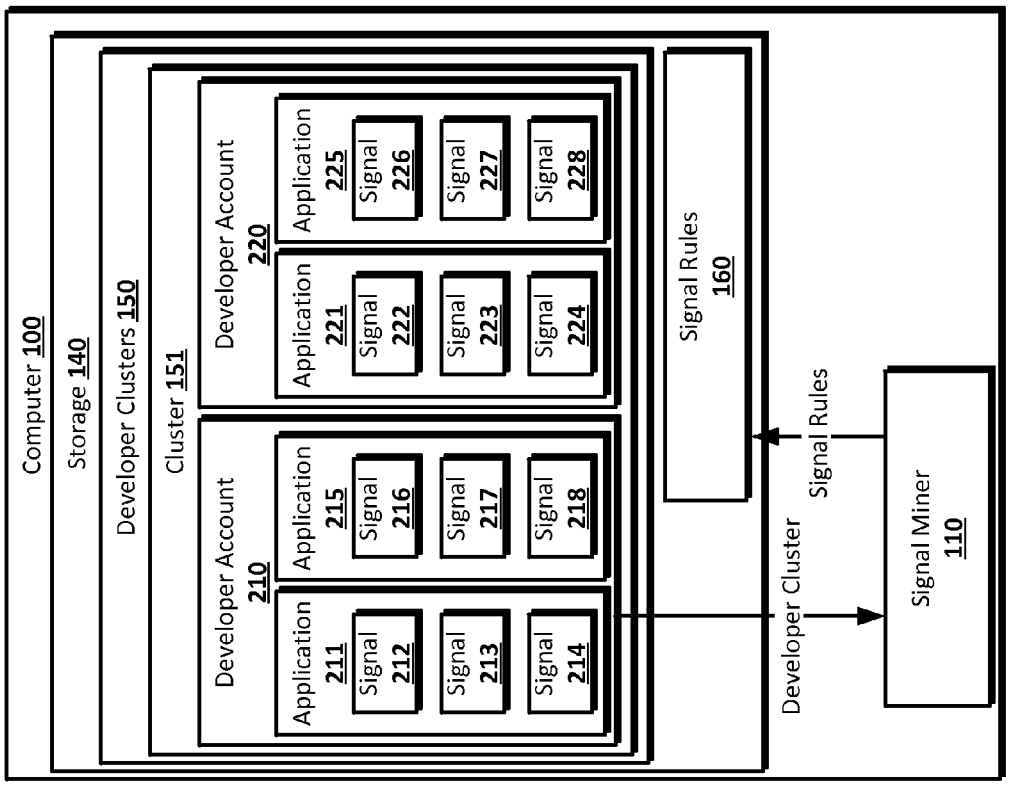
FIG. 1 shows an example system suitable for mining signals from developer clusters according to an implementation of the disclosed subject matter.

Signals mined from developer clusters may be used to generate signal rules, which may be used to proactively ban applications submitted to an application ecosystem. In general, a signal as disclosed herein includes any indicator, such as a binary yes/no or true/false indicator, a probability, a ranking, an occurrence count, a score, or the like, that provides information relating to a particular aspect of one or more accounts, users, identities, or the like. In an implementation of the disclosed subject matter, signal rules may govern whether applications are allowed into an application ecosystem. The signal rules may be rules related to signals, such as account signals, application signals, and financial signals, associated with developer accounts and applications submitted from the developer accounts. For example, one of the signal rules may indicate that the presence of a particular application signal in an application submitted to the application ecosystem should result in the banning of the application from the application ecosystem. The applications may be of any application type, such as, for example, a game, system tool, productivity application, or media player, for any type of computing device, such as, for example, personal computers and mobile computing devices.

The account signals may include, for example, a spam signal, an Internet Protocol (IP) address signal, and an umbrella account conversion time signal. The application signals may include an application flagging signal, an advertising identification signal, a certificate signal, and an asset signal. The advertising identification signal, the certificate signal, and the asset signal may also be combined into a combination application signal. The financial signals may include a buyer signal.

The signal rules may be generated by mining signals, such as the account signals, the application signals, and the financial signals, from developer clusters. The developer clusters may be groups of related developer accounts in the application ecosystem, and a developer cluster may include developer accounts that have been banned from submitting applications to the application ecosystem along with developer accounts that are allowed to submit applications to the application ecosystem. Developer accounts may be grouped into the developer clusters in any suitable manner, for example, based on shared signals among the developer accounts. Each developer cluster may represent an individual actor, for example, a development company or set of individuals operating relating development companies and submitting applications from different developer accounts. The developer accounts in the developer cluster may be associated with applications that were submitted from the developer accounts.

The spam signal may be a score based on the number of accounts, including developer accounts and umbrella accounts, created by the user who created the developer account. The umbrella account may be an account for a larger ecosystem that includes, for example, e-mail services, cloud storage, and other services, along with access to the application ecosystem. For example, a higher number of overall accounts created by the same user that created the developer account may result in a higher spam signal for the developer account and the applications submitted from the developer account. A score of 0 for the spam signal may be equivalent to the absence of the spam signal.

The IP address signal may include the IP addresses used to log in to the developer account. For example, if three IP addresses have been used to log in to the developer account, the three IP addresses may be the IP address signal for the developer account, and for applications submitted from the developer account.

The umbrella account conversion time signal may be the amount of time between the creation of an umbrella account for the larger ecosystem of which the application system is a part and the conversion of the umbrella account into a developer account for the application ecosystem. For example, if the developer account was converted from an umbrella account 34 hours after the creation of the umbrella account, the umbrella account conversion time signal for the developer account and applications submitted from the developer account may be 34 hours.

The application flagging signal may be based on whether an application submitted to the application ecosystem has been flagged as security risk or as being in violation of policies of the application ecosystem. The flagging of applications may be done by, for example, an application scorer, which may score applications based on the level of security risk they pose or on violations of application ecosystem policies and flag applications with scores that reach a threshold. The application flagging signal may be the presence or absence of a flag for an application. For example, an application that was flagged by the application scorer may have the application flagging signal, as would the developer account that submitted the application. The absence of a flag may be equivalent to the absence of the application flagging signal.

The advertising identification signal may include the advertising identifications used by the developer account and applications submitted by the developer account. The advertising identifications may be unique identifiers issued by, for example, the application ecosystem, to allow developers to collect advertising revenue from their applications, and may be used by the developer account for both the developer account itself and the applications submitted through the developer account. For example, if the developer account has submitted applications that use two different advertising identifications, the two advertising identifications may be the advertising identification signal for the developer account. The advertising identification used by one of the applications may be the advertising identification signal for that application.

The certificate signal may include certificates used to sign applications submitted from the developer account. The certificates may be issued by, for example, the application ecosystem, and may be cryptographic certificates. The certificate may be represented by, for example, a private key, which may be used to sign applications with the certificate. For example, if the developer account has submitted applications signed with two different certificates, the two certificates may be the certificate signal for the developer account. The certificate used by one of the applications may be the certificate signal for the application.

The asset signal may include the assets used within applications submitted by the developer account. Assets, such as libraries, may be used by developers to construct applications for the application ecosystem, and may be reused in different applications. For example, if the developer account has submitted two applications that use twelve identifiable assets, the assets may be the asset signal for the developer account. The assets used by one of the applications may be the asset signal for the application.

The combination application signal may be a combination of the advertising identification signal, the certificate signal, and the asset signal for the applications submitted from the developer account. The advertising identifications, assets, and certificates used by the applications submitted from the developer account may be matched the advertising identifications, assets, and certificates used in applications submitted from banned developer accounts. A higher number of matches may result in a stronger combination application signal for the application, and for the developer account that submitted the application.

The buyer signal may include data items about the user who opened the developer account. The data items may include individual names, company names, e-mail addresses, physical addresses, phone numbers, IP addresses and payment information. For example, the collection of data items about the user who opened the developer account may be the buyer signal for the developer account and for applications submitted from the developer account.

The developer accounts that submit applications to the application ecosystem may be evaluated based on the signals for the developer account and the applications submitted from the developer account. For example, a risk probability that incorporates the signals may be determined for the developer account. Evaluation of the developer accounts may lead to developer accounts being banned from submitting applications to the application ecosystem. For example, a high risk probability for a developer account may trigger an automatic ban on the developer account, or may be used during manual review to determine that the developer account should be banned. The banning of a developer account may also ban all the applications submitted from that developer account. Applications may also be evaluated and banned from the application ecosystem individually.

The developer clusters, including active and banned developer accounts, may be mined for the signals to determine, for example, which signals are most correlated with developer accounts and applications that have been banned. A banned prevalence percentage may be determined for the signals extracted from within a developer cluster, and the banned prevalence percentage may be used to determine which signals should be used to generate signal rules, and what the effect of those signal rules should be. The banned prevalence percentage for a signal in a developer cluster may be based on the number of banned developer accounts or applications in the developer cluster that the signal is found in as compared to the total number of developer accounts or applications in the developer cluster that the signal is found in. For example, if a unique advertising identification is used by 1000 applications submitted from developer accounts within a developer cluster, and 800 of those applications have been banned from the application ecosystem, either due to being banned individually or being submitted from a banned developer account, the banned prevalence percentage for the unique advertising identification within the developer cluster may be 800/1000=80%.

The banned prevalence percentages may be used to generate signal rules by, for example, comparing the banned prevalence percentage for the signals with preset thresholds. Signal rules may be generated when the banned prevalence percentage for the signal exceeds a certain threshold, and the effect of the rule may be based on the amount by which the threshold is exceeded, and the nature of the signal used to generate the rule. For example, the banned prevalence percentage of 80% for the unique advertising identification may exceed a threshold of 75%, and may result in a signal rule automatically banning any application submitted to the application ecosystem that includes the unique advertising identification in its advertising identification signal. There may be a minimum number of occurrences of the signal within the developer cluster required before a signal rule can be generated from the signal. For example, a signal that is only found in one application in the developer cluster, which may include 1000 applications, may not be used to generate a signal rule even if the banned prevalence percentage for that signal is 1/1=100%. A larger sample size for the signal may be needed before generating the signal rule.

Different signals may have different thresholds, and the signal rules generated from different signals may have different effects. For example, the advertising identification signal may have a higher threshold for generating a signal rule that results in automatic banning, as advertising identifications may end up in software development libraries shared among a wide variety of developers. This may lead to the same advertising identification ending up in a mix of applications, some of which should be banned, and some of which should not be. A higher banned prevalence percentage for the advertising identification signal may ensure that the advertising identifications that are mostly used in applications that should be banned result in signal rules for automatic banning, while advertising identifications that are more evenly distributed among applications that should and should not be banned do not result in signal rules that lead to automatic banning. For example, a unique advertising identification with a banned prevalence percentage of 60% within a developer cluster may result in a signal rule that flags any submitted application using the unique advertising identification for review, for example, by an administrator of the application ecosystem, instead of automatically banning the application. The signals may be mined from the developer clusters in any suitable manner, for example, using machine learning systems.

The signals may also be mined from the application ecosystem globally, or from any subset of the developer accounts within application ecosystem, including the developer clusters. The banned prevalence percentage for a signal may be determined with respect to the portion of the application ecosystem the signal was mined from. For example, if signals are mined from 1,000,000 applications, the banned prevalence percentages may be determined based on those 1,000,000 applications.

The signal rules generating by mining signals from one of the developer clusters may be applied globally, to all applications submitted to the application ecosystem from all developer accounts, and not just from developer accounts that are part of the developer cluster used to generate the signal rule. When an application is submitted to the application ecosystem, the signals may be extracted from the application and compared to the signal rules, to determine if any of the signal rules apply to the application. For example, an application may include the advertising identification signal, in the form of a unique advertising identification embedded within the application. The unique advertising identification, which may be, for example, an alphanumeric string, may be extracted from the application and compared to any signal rules regarding the advertising identification signal. If the unique advertising identification from the application matches the unique advertising identification specified in one of the signal rules, that signal rule may be applied to determine the disposition of the application, which may include flagging the application for review or banning the application.

The number of signal rules that apply to an application may be used to determine whether to ban the developer account from which the application was submitted. For example, if only one signal rule applies to the application, the application may be dealt with as specified in the signal rule, but the developer account may be left alone. If multiple signal rules apply to the application, for example, signal rules regarding the certificate signal, advertising identification signal, and buyer signal, the developer account that submitted the application may be automatically banned. The number and combination of signals in the application that need to trigger signal rules for the developer account to be banned may be set in any suitable manner for the application ecosystem. Other factors may also be taken into account when determining whether or not to ban a developer account that submitted an application that was automatically banned, such as the risk probability for the developer account, or the combination of the banned prevalence percentage for the signals found in applications submitted by the developer account.

The signal rules may allow for the correlation of newly submitted applications from newly created developer accounts with developer accounts, including banned developer accounts, in a developer cluster. For example, several signal rules may be generated by mining signals from a developer cluster that includes mostly banned developer accounts. The signal rules may concern different signals found in applications submitted by the developer accounts in the developer cluster. The actor behind the developer accounts in the developer cluster, for example, an individual or development company, may create new developer accounts and submit new applications with certain signals changed from the applications that were banned. For example, the new applications may use a different advertising identification than an advertising identification used by the banned applications that may have resulted in a signal rule banning any application with that advertising identification. However, other signals in the application may still trigger signal rules that were generated from the developer cluster, allowing both the banning of the new applications and the new developer accounts, and the addition of the new developer accounts to the developer cluster. The number and combination of signal rules generated from signals from a developer cluster that need to be triggered to add the developer account to the developer cluster may be a configurable parameter, statistically determined, or determined by, for example, machine learning.

For example, the developer cluster may have 90% of the developer accounts in the developer cluster banned. 6 signal rules may be generated based on mining signals from the developer cluster. A new developer account may submit a new application that triggers 5 of the 6 signal rules that were generated from the signals in the developer cluster, with the developer having modified one of the signals. This may indicate that the new developer account is related to the developer accounts in the developer cluster, and may need to be banned.

In addition, the modified signals in the application may be used to generate further signal rules. For example, if the new application triggers 5 of the 6 signal rules that were generated for signals in the developer cluster, the one signal that was modified may also be used to generate a signal rule, as the modified signal may now be considered to correlate strongly to the developer cluster and the banned developer accounts and applications therein. For example, the developer may have changed the advertising identification used in the new application from the advertising identification used in previous, banned applications. The new advertising identification may be used to generate a signal rule, for example, automatically banning any application submitted using the new advertising identification.

The signals may be stack-ranked within the developer cluster based on the banned prevalence percentage for the signal. This may allow for the determination of the signals that are most indicative of banned applications within the developer cluster.

FIG. 1 shows an example system suitable for mining signals from developer clusters according to an implementation of the disclosed subject matter. A computer 100 may include a signal miner 110, an application filter 120, and storage 140. The computer 100 may be any suitable device, such as, for example, a computer 20 as described in FIG. 6, for implementing the signal miner 110, the application filter 120, and the storage 140. The computer 100 may be a single computing device, or may include multiple connected computing devices. The signal miner 110 may use signals from developer clusters 150 to generate signal rules 160. The application filter 120 may use the signal rules 160 to evaluate applications submitted to an application ecosystem. The storage 140 may store the developer clusters 150, including clusters 151, 153, 155, and 157, and the signal rules 160, in any suitable format.

Figure 2:
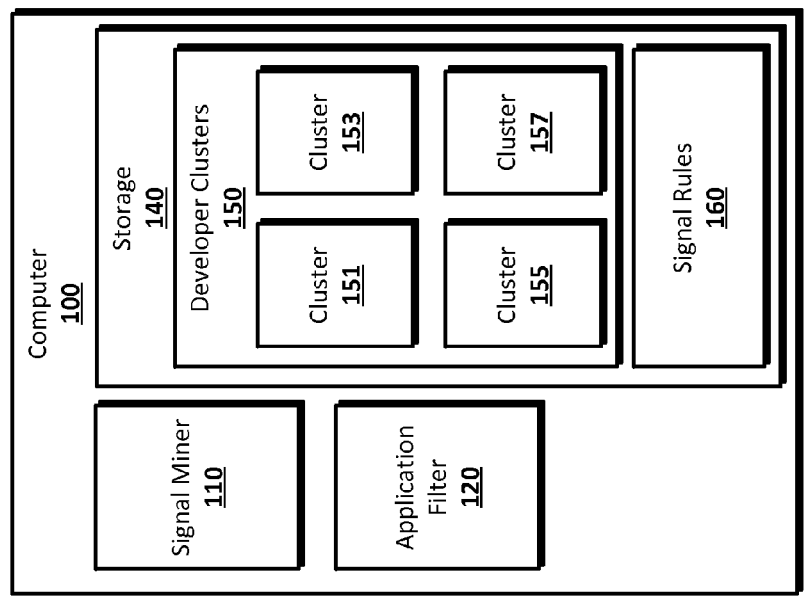
FIG. 2 shows an example arrangement for mining signals from developer clusters according to an implementation of the disclosed subject matter.

FIG. 2 shows an example arrangement for mining signals from developer clusters according to an implementation of the disclosed subject matter. The signal rules 160 may be generated by, for example, the signal miner 110, based on signals found within clusters of developers, such as the cluster 151 of the developer clusters 150. The developer cluster 151 may include developer accounts 210 and 220, which may be developer accounts for the application ecosystem that have been clustered based on any suitable clustering mechanism. The developer accounts 210 and 220 may be developer accounts used by a single actor, for example, development company, individual, or associated group of individuals, for submitting applications to the application ecosystem. The applications 211 and 215 may have been submitted from the developer account 210, and the applications 221 and 225 may have been submitted from the developer account 220.

The applications 211, 215, 221 and 225 may include or be associated with signals. The application 211 may include, or be associated with, signals 212, 213, and 214. The application 215 may include, or be associated with, signals 216, 217, and 218. The application 221 may include, or be associated with, signals 222, 223, and 224. The application 225 may include, or be associated with, signals 226, 227, and 228. The signals 212, 213, 214, 216, 217, 218, 222, 223, 224, 226, 227, and 228 may be, for example, any of the account signals, financial signals, and applications signals, such as the spam signal, the IP address signal, the advertising identification signals, the certificate signal, the asset signal, the application flagging signal, umbrella account conversion time signal, the combination application signal, and the buyer signal.

The signals 212, 213, 214, 216, 217, 218, 222, 223, 224, 226, 227, and 228 may be extracted from the applications 211, 215, 221, and 225 by, for example, the signal miner 110. Some of the signals 212, 213, 214, 216, 217, 218, 222, 223, 224, 226, 227, and 228 may be included within the applications 211, 215, 221, and 225, and may be extracted directly from them. For example, the signal miner 110 may extract alphanumeric strings that are advertising identifications or certificates directly from the applications 211, 215, 221, and 225. Some of the signals 212, 213, 214, 216, 217, 218, 222, 223, 224, 226, 227, and 228 may be associated with the applications 211, 215, 221, and 225, for example, based on the developer account from which the application was submitted. For example, the signal miner 110 may extract the data items for the buyer signal for the applications 211 and 215 from the developer account 210.

The signals 212, 213, 214, 216, 217, 218, 222, 223, 224, 226, 227, and 228 may be correlated with each other and with the status of the applications 211, 215, 221, and 225, and the developer accounts 210 and 220, to determine banned prevalence percentages, for example, by the signal miner 110. For example, the signals 212, 216, 222, and 226 may be advertising identification signals, and may be the advertising identification #55555555. The banned prevalence percentage for the advertising identification #55555555 may be determined within the cluster 151 based on which of the applications 211, 215, 221, and 225, and the developer accounts 210 and 220, are banned. For example, if the applications 211, 214, and 221 are banned, and the application 225 is not banned, the banned prevalence percentage for the advertising identification #55555555 may be $3/4=75\%$.

The signals 213, 217, 223, and 227 may be IP address signals. The signals 213 and 217 may be inherited from the developer account 210 that submitted the applications 211 and 215, and the signals 223 and 227 be inherited from the developer account 220 that submitted the applications 221 and 225. The IP address used to log in to the developer accounts 210 and 220 may be 192.168.0.1. If the developer account 210 is banned, then the applications 211 and 215 may also be banned. If the developer account 220 is not banned, and the applications 221 and 225 have not been banned individually, the banned prevalence percentage for the IP address 192.168.0.1 may be $2/4=50\%$.

The signals 214, 218, 224, and 228 may be certificate signals. The signal 214 may be a certificate with a key of Ser. No. 12/345,678. The signals 218, 224, and 228 may be certificates with a key of 87654321. If the application 211 is banned and the applications 215, 221, and 225 are not banned, the banned prevalence percentage for the certificate signal of 12345678 may be $1/1=100\%$, while the banned prevalence percentage for the certificate signal of 87654321 may be 0%.

The banned prevalence percentages may be used by, for example, the signal miner 110, to generate the signal rules 160. For example, the banned prevalence percentage of 75% for the advertising identification #55555555 may meet the threshold for the generation of a signal rule 160 that automatically bans any application submitted to the application ecosystem that includes the advertising identification #55555555. The banned prevalence percentage of 50% for the IP address 192.168.0.1 may result in the generation of a signal rule 160 that flags for review any application submitted to the application ecosystem from a developer account that has been logged into from the IP address 192.168.0.1. The banned prevalence percentage of 100% for the certificate with a key of 12345678 may meet the threshold for the generation of a signal rule 160 that automatically bans any application submitted to the application ecosystem that includes the certificate with a key of Ser. No. 12/345,678, however, the sample size of 1 may be too small for the signal rule 160 to be generated. The signal rules 160 may also include data about the developer clusters and developer accounts used in the generation of each of the signal rules 160, so that future developer accounts may be clustered with previous developer accounts based on which of the signal rules 160 are triggered by applications submitted from the future developer accounts.

Signals may be extracted and correlated among all of the developer accounts within a developer cluster, such as the cluster 151, or among any subset of all of the developer accounts within the application ecosystem. For example, the signal miner 110 may determine the banned prevalence percentage for a signal based on the presence of the signal within the applications submitted by developer accounts within all of the clusters 151, 153, 155, and 157 in the developer clusters 150, instead of just the applications 211, 215, 221, and 225 submitted from the developer accounts 210 and 220 in the cluster 151.

Figure 3:
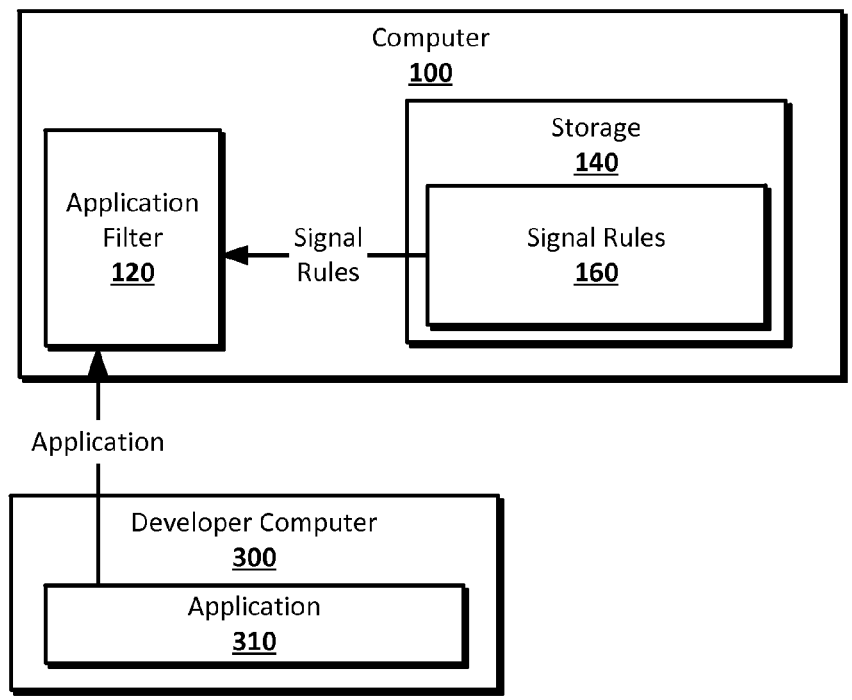
FIG. 3 shows an example arrangement for filtering applications according to an implementation of the disclosed subject matter.

FIG. 3 shows an example arrangement for filtering applications according to an implementation of the disclosed subject matter. The signal rules 160 may be used, by for example, the application filter 120, to evaluate applications submitted to the application ecosystem. An application 310 may be submitted to the application ecosystem from a developer computer 300, using a developer account that has not been banned. The application filter 120 may extract any available signals from the application 310, for example, extracting the advertising identification signal directly from the application 310, the IP address signal from the IP address of the developer computer 300 used to log in to the developer account and submit the application 310, and the data items for the buyer signal from the developer account used by the develop computer 300.

The signals extracted from the application 310 may be compared to the signal rules 160. The application filter 120 may determine if any of the signals from the application 310 trigger any of the signal rules 160, and may then dispose of the application 310 accordingly. For example, if none of the signal rules 160 are triggered by the application 310, the application 310 may be added into the application ecosystem for distribution. If the application 310 includes an advertising identification signal that is the advertising identification #55555555, the application 310 may trigger the signal rule 160 generated by the signal miner 110 from the cluster 151, which may automatically ban the application 310.

The disposition of the application 310 may be based on the number and strictness of the signal rules 160 triggered by the application 310. For example, if the application 310 triggers two signal rules 160, one of which flags the applications 310 for review, and the other which automatically bans the application 310, the application 310 may be automatically banned instead of just being flagged for review. If the application 310 triggers some number of the signal rules 160, all of which would result the application 310 being banned, the application 310 may be banned and the developer account logged into by the developer computer 300 to submit the application 310 may also be banned. The number and type of triggered signal rules 160 that may result in the banning of developer accounts may be determined in any suitable manner, including, for example, through machine learning. The risk probability for the developer account may also be used when determining whether the developer account should be banned based the signal rules 160 triggered by the application 310.

Figure 4:
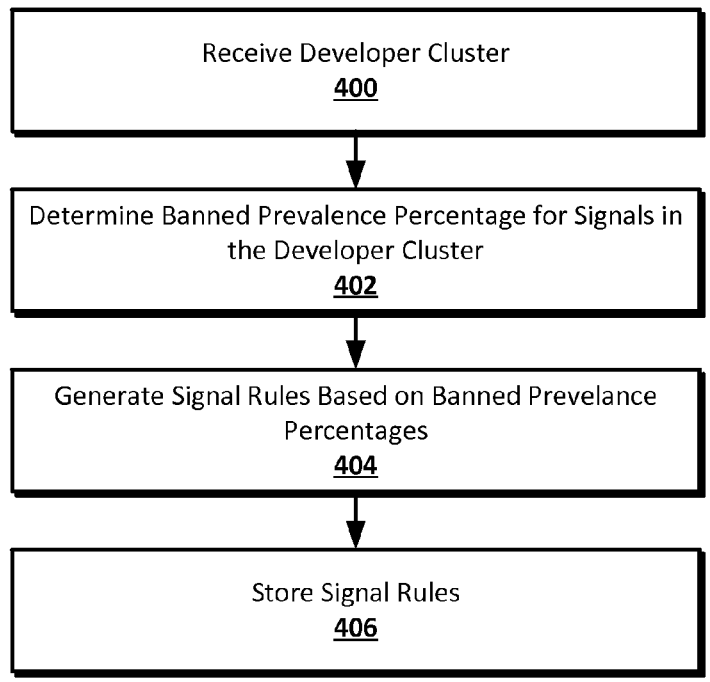
FIG. 4 shows an example process for mining signals from developer clusters according to an implementation of the disclosed subject matter.

FIG. 4 shows an example process for mining signals from developer clusters according to an implementation of the disclosed subject matter. At 400, a developer cluster may be received. For example, the signal miner 110 may receive the cluster 151, including the developer accounts 210 and 220, from the developer clusters 150.

At 402, banned prevalence percentages may be determined for signals within the developer cluster. For example, the signal miner 110 may extract the signals 212, 213, 214, 216, 217, 218, 222, 223, 224, 226, 227, and 228, from the applications 211, 215, 221, and 225, and the developer accounts 210 and 220. The signals 212, 213, 214, 216, 217, 218, 222, 223, 224, 226, 227, and 228 may be correlated to determine which signals are the same across the applications 211, 215, 221, and 225. The banned prevalence percentage for signals that are the same may be determined based on how many of the applications 211, 215, 221, and 225 in which the signals are included are banned. For example, the same advertising identification signal may appear in the applications 211, 215, and 221, and the applications 211 and 215 may be banned, resulting in a banned prevalence percentage of ⅔=66%.

At 404, signal rules may be generated from the banned prevalence percentages. For example, the signal miner 110 may generate the signal rules 160 based on the banned prevalence percentages determined for the signals 212, 213, 214, 216, 217, 218, 222, 223, 224, 226, 227, and 228 from within the cluster 151. For example, the banned prevalence percentage for the advertising identification in the signals 211, 215, and 221 of 66% may result in the generation of a signal rule 160 that flags for review any application submitted to the application ecosystem that includes an advertising identification signal with an advertising identification that matches the advertising identification in the signals 211, 215, and 221.

At 406, the signal rules may be stored. For example, the signal miner 110 may store the signal rules 160 in the storage 140, where the signal rules 160 may be later accessed for use in evaluating applications submitted to the application ecosystem.

Figure 5:
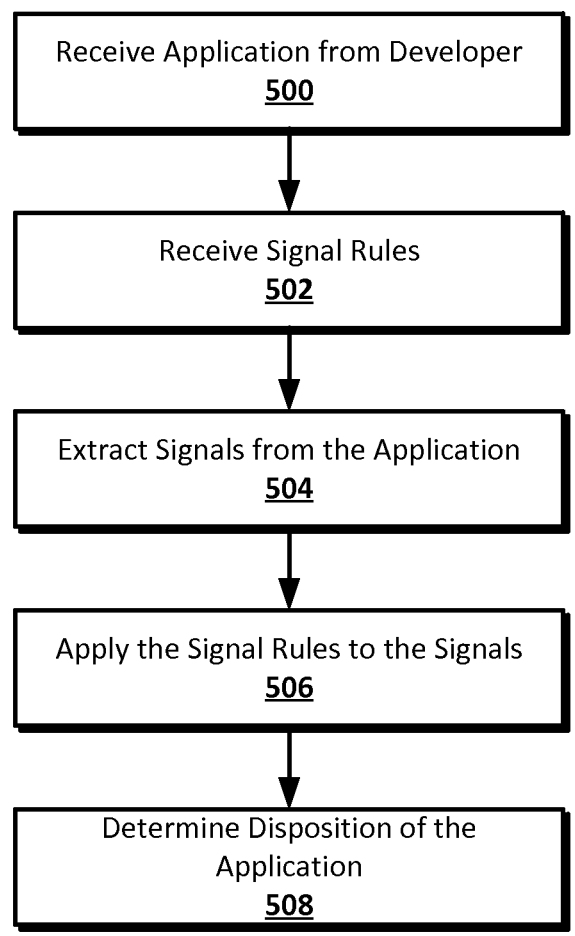
FIG. 5 shows an example process for filtering applications according to an implementation of the disclosed subject matter.

FIG. 5 shows an example process for filtering applications according to an implementation of the disclosed subject matter. At 500, an application may be received from a developer. For example, the application 310 may be submitted to the application system from the developer computer 300, which may be logged in to a developer account that has not been banned. The application 310 may be received by the application filter 120.

At 502, the signal rules may be received. For example, the application filter 120 may be received by the application filter 120 from the storage 140.

At 504, signals may be extracted from the application. For example, the application filter 120 may extract any available account signals, financial signals, and application signals from the application 310, either directly from the application 310 or from the developer account through which the developer computer 300 submitted the application 310. For example, the application 310 may include the advertising identification signal, which may be the advertising identification #55555555.

At 506, the signal rules may be applied to the signals from the application. For example, the application filter 120 may apply the signal rules 160 to the signals extracted from the application 310 to determine which of the signal rules 160 are triggered by the extracted signals. For example, the advertising identification signal that includes the advertising identification #55555555 may trigger one of the signal rules 160 that applies to any application that includes advertising identification #55555555.

At 508, the disposition of the application may be determined. For example, the application filter 120 may allow the application 310 into the application ecosystem, flag the application 310 for review, ban the application 310 from the application ecosystem, or ban from the application ecosystem both the application 310 and the developer account used by the developer computer 300 to submit the application 310, depending on the signal rules 160 triggered by the signals extracted from the application 310. For example, the advertising identification signal extracted from the application 310 may be the advertising identification #55555555, which may trigger the signal rule 160 that automatically bans the application 310 from the application ecosystem. The application 310 may be disposed of in accordance with the determination of the application filter 120.

Figure 6:
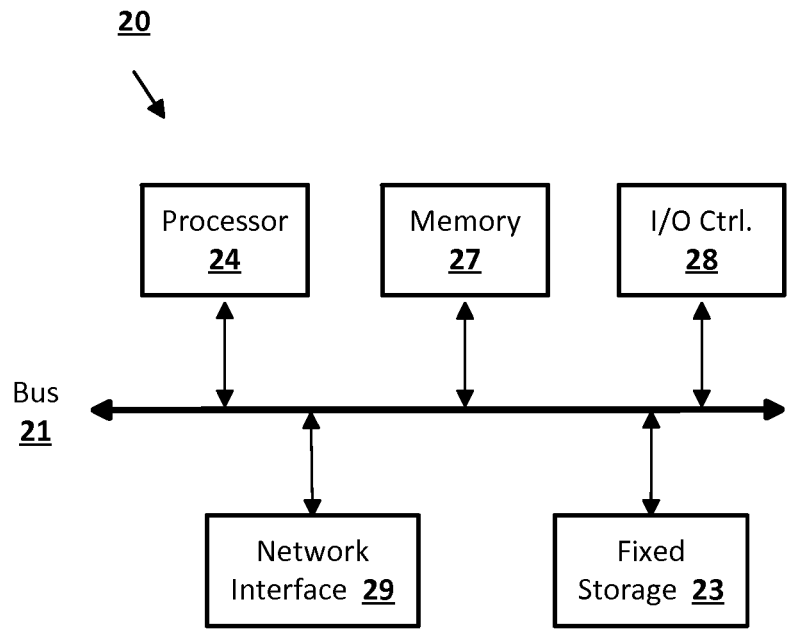
FIG. 6 shows a computer according to an embodiment of the disclosed subject matter.

Embodiments of the presently disclosed subject matter may be implemented in and used with a variety of component and network architectures. FIG. 6 is an example computer system 20 suitable for implementing embodiments of the presently disclosed subject matter. The computer 20 includes a bus 21 which interconnects major components of the computer 20, such as one or more processors 24, memory 27 such as RAM, ROM, flash RAM, or the like, an input/output controller 28, and fixed storage 23 such as a hard drive, flash storage, SAN device, or the like. It will be understood that other components may or may not be included, such as a user display such as a display screen via a display adapter, user input interfaces such as controllers and associated user input devices such as a keyboard, mouse, touchscreen, or the like, and other components known in the art to use in or in conjunction with general-purpose computing systems.

The bus 21 allows data communication between the central processor 24 and the memory 27. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as the fixed storage 23 and/or the memory 27, an optical drive, external storage mechanism, or the like.

Each component shown may be integral with the computer 20 or may be separate and accessed through other interfaces. Other interfaces, such as a network interface 29, may provide a connection to remote systems and devices via a telephone link, wired or wireless local- or wide-area network connection, proprietary network connections, or the like. For example, the network interface 29 may allow the computer to communicate with other computers via one or more local, wide-area, or other networks, as shown in FIG. 7.

Many other devices or components (not shown) may be connected in a similar manner, such as document scanners, digital cameras, auxiliary, supplemental, or backup systems, or the like. Conversely, all of the components shown in FIG. 6 need not be present to practice the present disclosure. The components can be interconnected in different ways from that shown. The operation of a computer such as that shown in FIG. 6 is readily known in the art and is not discussed in detail in this application. Code to implement the present disclosure can be stored in computer-readable storage media such as one or more of the memory 27, fixed storage 23, remote storage locations, or any other storage mechanism known in the art.

Figure 7:
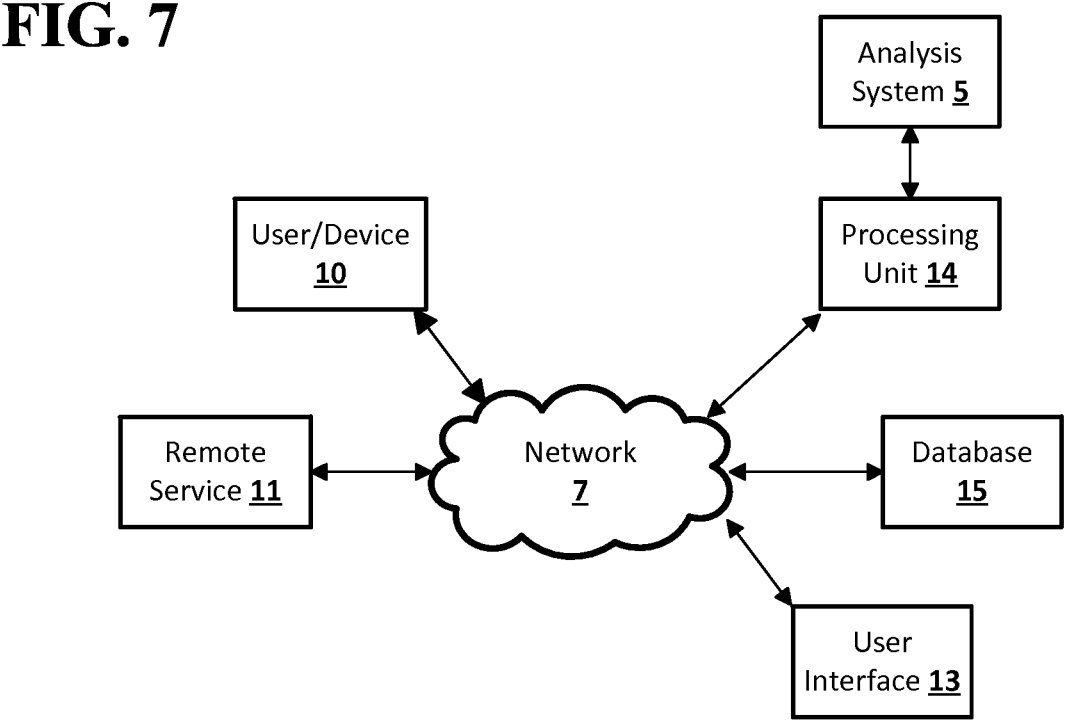
FIG. 7 shows a network configuration according to an embodiment of the disclosed subject matter.

FIG. 7 shows an example arrangement according to an embodiment of the disclosed subject matter. One or more clients 10, 11, such as local computers, smart phones, tablet computing devices, remote services, and the like may connect to other devices via one or more networks 7. The network may be a local network, wide-area network, the Internet, or any other suitable communication network or networks, and may be implemented on any suitable platform including wired and/or wireless networks. The clients 10, 11 may communicate with one or more computer systems, such as processing units 14, databases 15, and user interface systems 13. In some cases, clients 10, 11 may communicate with a user interface system 13, which may provide access to one or more other systems such as a database 15, a processing unit 14, or the like. For example, the user interface 13 may be a user-accessible web page that provides data from one or more other computer systems. The user interface 13 may provide different interfaces to different clients, such as where a human-readable web page is provided to web browser clients 10, and a computer-readable API or other interface is provided to remote service clients 11. The user interface 13, database 15, and processing units 14 may be part of an integral system, or may include multiple computer systems communicating via a private network, the Internet, or any other suitable network. Processing units 14 may be, for example, part of a distributed system such as a cloud-based computing system, search engine, content delivery system, or the like, which may also include or communicate with a database 15 and/or user interface 13. In some arrangements, an analysis system 5 may provide back-end processing, such as where stored or acquired data is pre-processed by the analysis system 5 before delivery to the processing unit 14, database 15, and/or user interface 13. For example, a machine learning system 5 may provide various prediction models, data analysis, or the like to one or more other systems 13, 14, 15.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. A method comprising:
   receiving, by a data processing apparatus, at least one application associated with an associated developer account that submitted the at least one application to an application ecosystem;
   extracting, by the data processing apparatus, at least one signal for the at least one application from at least one of the at least one application or the associated developer account, wherein each signal from the at least one signal comprises an indicator that provides information relating to a particular aspect of either the respective application or the respective associated developer account;
   determining, by the data processing apparatus, a banned prevalence percentage for the at least one signal, the banned prevalence percentage indicating either a number of banned developer accounts that include the at least one signal relative to a total number of developer accounts in the application ecosystem or a number of banned applications that include the at least one signal relative to a total number of applications in the application ecosystem;
   comparing, by the data processing apparatus, the banned prevalence percentage to a banned prevalence percentage threshold for the at least one signal;

generating, by the data processing apparatus, at least one signal rule for the at least one signal based on the comparison of the banned prevalence percentage to the banned prevalence percentage threshold for the at least one signal; and storing the at least one signal rule.

2. The method of claim 1, further comprising:

receiving, by the data processing apparatus, an application submitted to the application ecosystem from a developer account that is not banned;

extracting, by the data processing apparatus, at least one signal for the application submitted to the application ecosystem from at least one of the submitted application or the developer account; and applying, by the data processing apparatus, the at least one signal rule to the application submitted to the application ecosystem.

3. The method of claim 2, wherein applying the at least one signal rule to the application submitted to the application ecosystem comprises one selected from the group consisting of: allowing the submitted application into the application ecosystem, flagging the submitted application for review, banning the submitted application from the application ecosystem, and banning the submitted application and the developer account that submitted the application from the application ecosystem.

4. The method of claim 2, wherein applying the at least one signal rule to the at least one signal from the application submitted to the application ecosystem further comprises determining if the at least one signal rule is applicable to the application submitted to the application ecosystem based on the at least one signal extracted from the application submitted to the application ecosystem.

5. The method of claim 1, wherein generating the at least one signal rule further comprises:

determining an amount by which the banned prevalence percentage exceeds the banned prevalence percentage threshold; and selecting an effect of the at least one signal rule based on the amount by which the banned prevalence percentage exceeds the banned prevalence percentage threshold.

6. The method of claim 1, wherein generating the at least one signal rule further comprises:

determining whether a quantity of occurrences of the at least one signal in the application ecosystem exceeds a sample size threshold; and selecting an effect of the at least one signal rule based on whether the quantity of occurrences of the at least one signal in the application ecosystem exceeds the sample size threshold.

7. The method of claim 1, wherein the at least one signal rule comprises the at least one signal, a characteristic of the at least one signal, and an action for an application comprising one of: flagging the submitted application for review, and banning the submitted application from the application ecosystem.

8. The method of claim 7, further comprising:

determining the action based on the banned prevalence percentage for the at least one signal and the banned prevalence percentage threshold for the at least one signal.

9. The method of claim 1, wherein the associated developer account associated with the at least one application is in a developer cluster within the application ecosystem, wherein the developer cluster comprises a plurality of developer accounts that each share a common characteristic.

10. The method of claim 1, wherein the indicator of a first signal of the at least one signal provides information relating to one or more of account information, application information, and financial information, wherein the account information comprises one item selected from the group consisting of: spam information, Internet Protocol address information, and umbrella account conversion time information, wherein the application information comprises one or more of application flagging information, advertising identification information, certificate information, asset information, and combination application information, and wherein the financial information comprises buyer information.

11. The method of claim 10, wherein the spam information comprises a score based on a quantity of umbrella accounts and developer accounts associated with a user of the associated developer account that submitted the at least one application.

12. The method of claim 10, wherein the Internet Protocol address information is based on an Internet Protocol address associated with the associated developer account that submitted the at least one application.

13. The method of claim 10, wherein the umbrella account conversion time information is based on an amount of elapsed time between creation of an umbrella account and a conversion of the umbrella account into the associated developer account that submitted the at least one application.

14. The method of claim 10, wherein the application flagging information is based on a flag set for the at least one application submitted from the associated developer account to the application ecosystem, wherein the flag indicates a security risk or policy violation in the at least one application.

15. The method of claim 10, wherein the advertising identification information is based on advertising identifiers issued by the application ecosystem for use in the at least one application.

16. The method of claim 10, wherein the asset information is based on assets used to build the at least one application.

17. The method of claim 10, wherein the buyer information is based on at least one data item for a user associated with the associated developer account that submitted the at least one application.

18. The method of claim 17, wherein the at least one data item comprises one or more of a contact name, a company name, a phone number, a physical address, an email address domain, an email address, a payment instrument, an Internet Protocol address, and a unique identifier for a computing device.

19. The method of claim 10, wherein the combination application information is based on the advertising identification information, the certificate information, and the asset information for the at least one application.

20. A computer-implemented system comprising:

a storage component configured to store one or more developer accounts from an application ecosystem and one or more signal rules, wherein the each developer account from the one or more developer accounts are associated with a respective one or more applications;

a signal miner configured to:

receive the one or more developer accounts, extract a first signal from the respective one or more applications associated with a first developer account from the one or more developer accounts, determine a banned prevalence percentage for the first signal, the banned prevalence percentage indicating either a number of banned developer accounts that include the first signal relative to a total number of developer accounts in the application ecosystem that include the first signal or a number of banned applications that include the first signal relative to a total number of applications in the application ecosystem that include the first signal, compare the banned prevalence percentage for the first signal to a banned prevalence percentage threshold for the first signal, and generate a first signal rule for the first signal based on the comparison of the banned prevalence percentage for the first signal to the banned prevalence percentage threshold for the first signal; and an application filter configured to:
receive a new application submitted to the application ecosystem, wherein the new applications include the first signal, and
apply the first signal rule to the new application.

21. The computer-implemented system of claim 20, wherein the application filter is configured to apply the first signal rule by allowing the new application into the application ecosystem, flagging the new application for review, banning the new application from the application ecosystem, or banning the new application and a developer account that submitted the new application from the application ecosystem.

22. The computer-implemented system of claim 20, wherein the signal miner is configured to generate the first signal rule by being configured to:
determine an amount by which the banned prevalence percentage for the first signal exceeds a banned prevalence percentage threshold, and
select an effect of the first signal rule based on the amount by which the banned prevalence percentage exceeds the banned prevalence percentage threshold.

23. A system comprising:
one or more computers; and
one or more storage devices storing instructions which, when executed by the one or more computers, cause the one or more computers to perform operations comprising:
receiving at least one application associated with an associated developer account that submitted the at least one application to an application ecosystem;
extracting at least one signal for the at least one application from at least one of the at least one application or the associated developer account, wherein each signal from the at least one signal comprises an indicator that provides information relating to a particular aspect of either the respective application or the respective associated developer account;
determining a banned prevalence percentage for the at least one signal, the banned prevalence percentage indicating either a number of banned developer accounts that include the at least one signal relative to a total number of developer accounts in the application ecosystem or a number of banned applications that include the at least one signal relative to a total number of applications in the application ecosystem;
comparing the banned prevalence percentage to a banned prevalence percentage threshold for the at least one signal;
generating at least one signal rule for the at least one signal based on the comparison of the banned prevalence percentage to the banned prevalence percentage threshold for the at least one signal; and
storing the at least one signal rule.

24. The system of claim 23, wherein the instructions, when executed by the one or more computers, cause the one or more computer to perform operations further comprising:
receiving an application submitted to the application ecosystem from a developer account that is not banned;
extracting at least one signal for the application submitted to the application ecosystem from at least one of the submitted application or the developer account;
applying the at least one signal rule to the application submitted to the application ecosystem.

25. The system of claim 23, wherein the instructions that cause the one or more computers to perform the operation of generating the at least one signal rule further comprise instructions that, when executed, cause the one or more computers to perform operations further comprising:
determining whether a quantity of occurrences of the at least one signal in the application ecosystem exceeds a sample size threshold; and
selecting an effect of the at least one signal rule based on whether the quantity of occurrences of the at least one signal in the application ecosystem exceeds the sample size threshold.

26. The system of claim 23, wherein the instructions that cause the one or more computers to perform the operation of generating the at least one signal rule further comprise instructions that, when executed, cause the one or more computers to perform operations further comprising:
determining an amount by which the banned prevalence percentage exceeds the banned prevalence percentage threshold; and
selecting an effect of the at least one signal rule based on the amount by which the banned prevalence percentage exceeds the banned prevalence percentage threshold.

* * * * *